Dec. 9, 1952 L. B. COOK 2,620,764
MOTORCYCLE SIMULATING ATTACHMENT FOR BICYCLES
Filed April 10, 1950 2 SHEETS—SHEET 1

L. B. Cook
INVENTOR
BY Snow & Co.
ATTORNEYS.

Dec. 9, 1952 L. B. COOK 2,620,764
MOTORCYCLE SIMULATING ATTACHMENT FOR BICYCLES
Filed April 10, 1950 2 SHEETS—SHEET 2
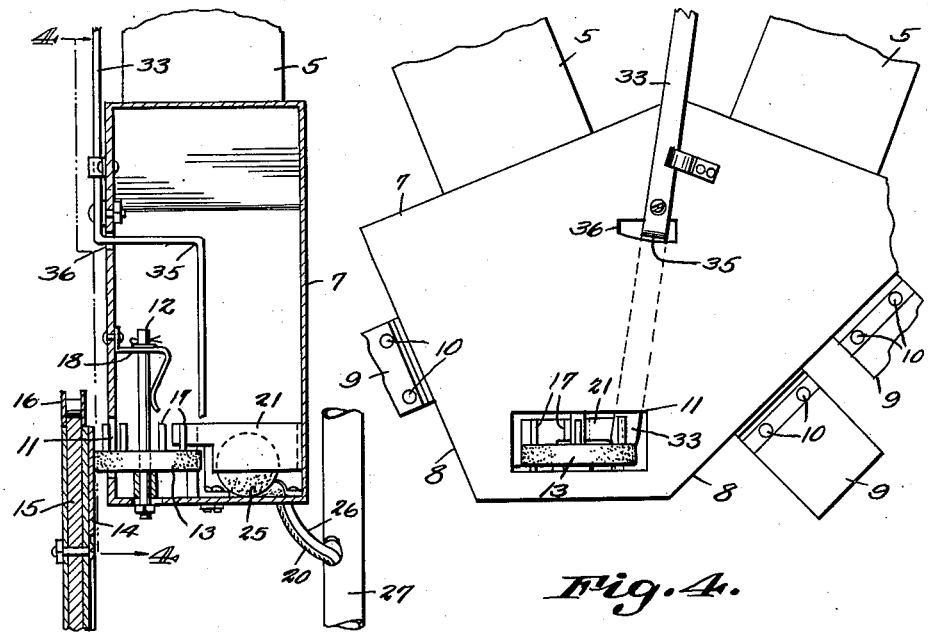
Fig. 3.
Fig. 4.
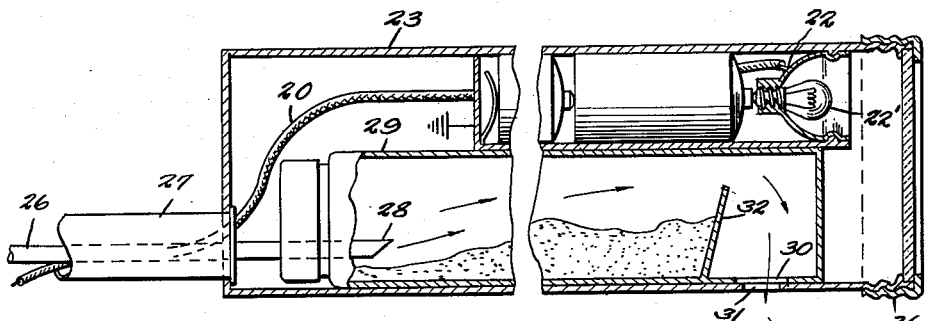
Fig. 5.
L. B. Cook
INVENTOR
BY
ATTORNEYS.

Patented Dec. 9, 1952

2,620,764

UNITED STATES PATENT OFFICE 2,620,764

MOTORCYCLE SIMULATING ATTACHMENT FOR BICYCLES

Louis B. Cook, Springfield, Mass.

Application April 10, 1950, Serial No. 155,114

2 Claims. (Cl. 116—56)

This invention relates to an attachment designed for use on bicycles, the primary object of the invention being to provide means in the form of an attachment which will change the appearance of the usual bicycle, so that it simulates a motorcycle.

An important object of the invention is to provide a device of this character which may be readily and easily attached to bicycles without the necessity of making extensive alterations in the bicycle structure, to mount the attachment.

Another object of the invention is to provide a device of this character having means for producing a sound effect simulating the noise incident to the operation of the usual internal combustion engine of a motorcycle, means also being provided for discharging a dust at the rear of the attachment to simulate the exhaust gases of a motorcycle.

Still another object of the invention is to provide means for controlling the sound effect apparatus, at the will of the person riding the bicycle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Fig. 3 is a vertical sectional view through the attachment.

Fig. 4 is a sectional view taken on line 4—4 of Fig. 3.

Fig. 5 is a longitudinal sectional view through the simulated motorcycle exhaust pipe.

Figure 1:
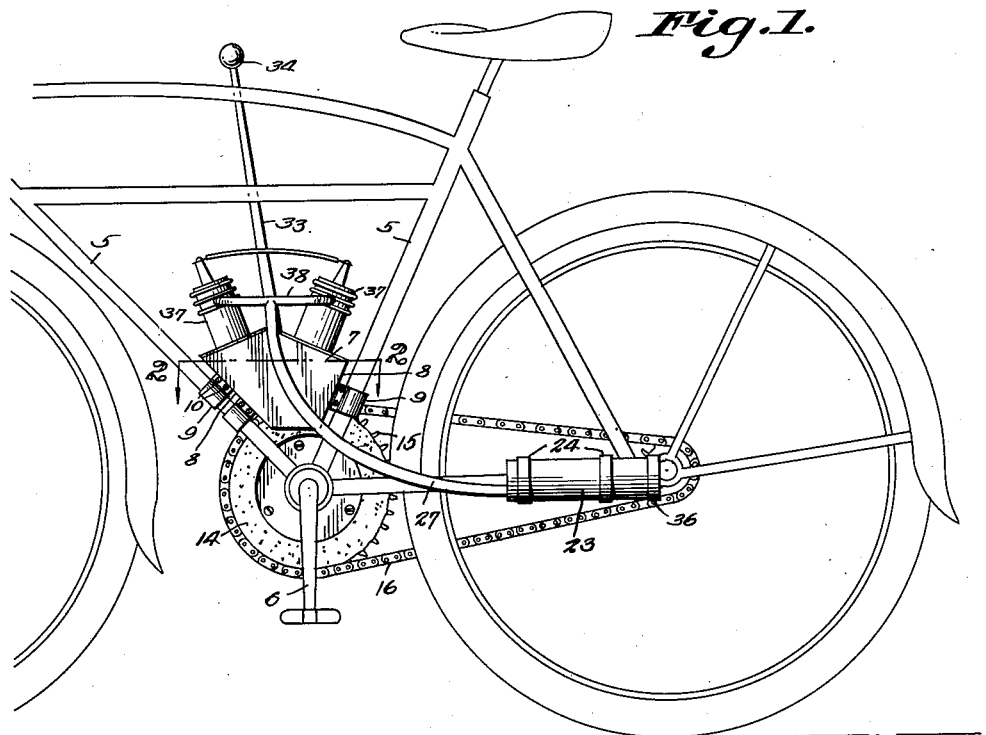
Fig. 1 is an elevational view, showing an attachment constructed in accordance with the invention, as mounted on a bicycle.
Figure 2:
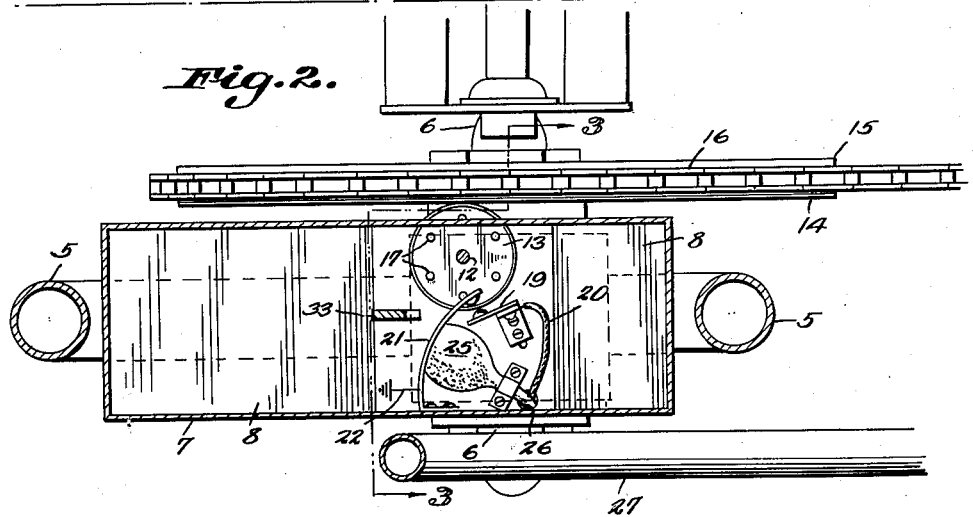
Fig. 2 is a sectional view taken on line 2—2 of Fig. 1.

Referring to the drawings in detail, the reference character 5 indicates the inclined front and rear bars of the main frame of a bicycle which provide a support for the pedal shaft of the bicycle, on which the pedal arms 6 are mounted in the usual way.

The attachment forming the essence of the present invention includes a box-like body portion indicated by the reference character 7 which has inclined front and rear walls 8, inclined so that they will fit between the bars 5 of the frame, in a manner as shown by Fig. 1 of the drawings.

The box-like body portion 7 is secured to the bars 5, by means of the bands 9 which are secured to flanges extending from the body portion, by means of screws 10.

Formed in one side wall of the body portion 7, and disposed adjacent to the bottom thereof, is the opening 11, and mounted adjacent to the opening, is the vertical shaft 12 on which the disc 13 is secured, the disc 13 being of a diameter to extend through the opening 11, where it contacts with the friction plate 14 which is secured to the sprocket 15 over which the chain 16 of the bicycle operates to operate the rear wheel of the bicycle, in the usual way.

Rising from the disc 13, are pins 17 which are arranged in a circular line the pins being disposed in spaced relation with respect to each other.

The upper end of the shaft 12 is mounted in the bearing arm 18 which is of a length to extend downwardly where it contacts with the shaft 12 to retard movement of the shaft 12 and prevent over-running of the shaft.

Mounted within the box-like body portion 7, is the stationary contact 19 which is in circuit with a suitable source of electricity supply, through the wire 20. Associated with the stationary contact 19, is the movable contact arm 21 which is grounded at 22, the contact arm 21 being flexible so that it may be moved towards the stationary contact 19 completing a circuit by contact therewith, as the disc 13 rotates. It is to be understood that the free end of the movable contact arm 21 normally lies in the path of travel of the pins 17, so that the arm 21 is moved to engage the stationary contact 19 completing a circuit to the lamp 22' which is contained in the cylindrical container 23 which is constructed and mounted on the bicycle to simulate the exhaust pipe of a motorcycle. Bands 24 are fitted around the cylindrical container housing 23, to secure the same to the frame of the bicycle.

The reference character 25 indicates a rubber bulb to which the rubber tube 26 is connected, the tube 26 extending into the pipe 27 that has its discharge end 28 extending into the container 29 which is provided with an opening 30 adapted to register with the opening 31 of the cylindrical container 23, so that chalk which is held within the container 29 may be exhausted through the registering openings simulating the exhaust gases emanating from an exhaust pipe of a motorcycle.

A partition 32 is arranged within the container 29 and provides a stop for the powdered chalk which is held within the container 29, to permit only small quantities of the chalk being discharged as the air from the bulb 25 is forced over the surface of the powdered chalk held within the container.

Pivotally mounted on the side wall of the box-like body portion 7, is the lever 33 the handle portion 34 thereof terminating adjacent to the operator's seat, so that the operator may have easy access thereto.

This lever 33 has an offset portion 35 that extends through the slot 36 in one wall of the box-like body portion 7, the lower end of the lever 33 terminating at a point adjacent to the movable contact arm 21, so that when the lever 33 is moved in one direction, the lower end of the lever will contact the movable arm 21 and move the arm 21 to a position whereby the pins 17 will miss the arm 21, as the disc 13 rotates. It will of course be understood that the movement of the contact arm 21 by the lever will be such that the contact points carried by the arms 21 and 19, will not engage when the movable contact arm 21 has been moved by the action of the lever 33.

The movable contact arm 21 is wide at its point of contact with the rubber bulb 25, so that with each movement of the contact arm 21, the bulb will be compressed to force air through the pipe 27 into the container 29 for blowing powdered chalk therefrom.

This movable contact arm 21 is constructed of flexible metal, and is so arranged that as the pins 17 pass thereover, the contact arm will snap against the pins causing a noise simulating the firing of an internal combustion engine of a motorcycle.

The end of the container 23 is closed by the screw cap 36, so that access to the interior of the cylindrical container 23 may be had at all times to repair or recondition the apparatus.

It will also be seen that when the cap 36 has been removed, the container 29 may be readily removed and refilled with powdered chalk.

From the foregoing it will be seen that due to the construction shown and described, I have provided a device which is designed for ready and easy positioning on a bicycle to convert the bicycle into a simulated motorcycle construction, the attachment having means to simulate the usual noise of a motorcycle internal combustion engine, as well as means to simulate the exhaust gases passing from the exhaust pipe of a motorcycle.

The reference character 37 indicates cylindrical members simulating the cylinders of a motorcycle, which extend from the upper surface of the box-like body portion 7, the pipe 27 being connected with the pipe 38 that connects with the cylinders 37, simulating the exhaust pipe or manifold of an engine.

Having thus described the invention, what is claimed is:

1. A motorcycle simulating apparatus for attachment to a bicycle having a sprocket, comprising a housing having cylinders thereon, fitted between adjacent bars of a bicycle frame, said housing having an opening in the side wall thereof, a vertical shaft mounted within the housing, a disc operating in a horizontal plane, secured to said shaft, vertical pins extending from the upper surface of the disc, the periphery of said disc engaging said sprocket effecting rotation of said disc as the sprocket rotates, and a movable yieldable arm mounted within the housing engaged by the pins, said arm adapted to snap into engagement with adjacent pins as the disc rotates, causing a noise simulating explosions of an internal combustion engine.

2. A motorcycle simulating apparatus for attachment to a bicycle having a sprocket, comprising a housing having cylinders thereon, fitted between adjacent bars of a bicycle frame, said housing having an opening in one wall thereof, a horizontally operating disc mounted within the housing, said disc extending through the opening in the wall of the housing contacting with said sprocket, effecting rotation of said disc by frictional contact with the sprocket as the sprocket rotates, a line of spaced pins rising from the disc, a yieldable horizontal arm mounted within the housing and engaged by said pins, said arm snapping into contact with said pins as the disc rotates, and a lever by means of which said arm is moved out of the path of travel of said pins on said disc.

LOUIS B. COOK.

REFERENCES CITED

The following references are of record in the file of this patent:

UNITED STATES PATENTS

| Number | Name | Date |
|---|---|---|
| 1,571,489 | Morihata | Feb. 2, 1926 |

FOREIGN PATENTS

| Number | Country | Date |
|---|---|---|
| 423,439 | Great Britain | Jan. 31, 1935 |
| 625,200 | France | Apr. 19, 1927 |